(No Model.)
H. J. GUNN.
DRAFT EQUALIZER.
No. 430,641. Patented June 24, 1890.
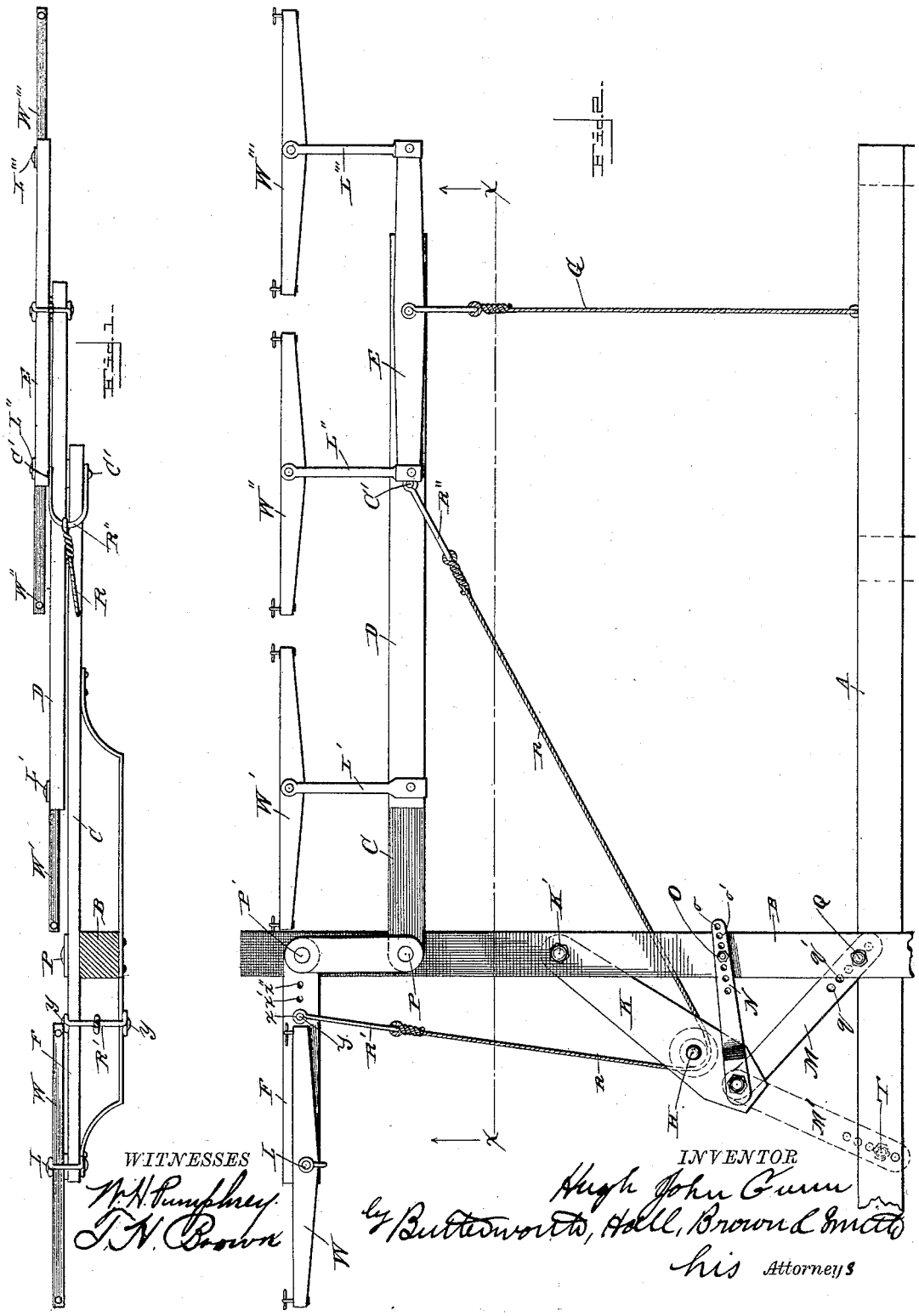
WITNESSES
INVENTOR
Hugh John Gunn
by Butterworth, Hall, Brown & Smith
his Attorneys
THE NORRIS PETERS CO., PHOTO-LITHO., WASHINGTON, D. C.

UNITED STATES PATENT OFFICE.

HUGH JOHN GUNN, OF OWASA, IOWA.

DRAFT-EQUALIZER.

SPECIFICATION forming part of Letters Patent No. 430,641, dated June 24, 1890.

Application filed March 31, 1890. Serial No. 345,945. (No model.)

*To all whom it may concern:*

Be it known that I, HUGH JOHN GUNN, a citizen of the United States, residing at Owasa, in the county of Hardin and State of Iowa, have invented certain new and useful Improvements in Draft-Equalizers; and I do hereby declare the following to be a full, clear, and exact description of the invention, such as will enable others skilled in the art to which it appertains to make and use the same.

My invention consists in the improved form of draft-equalizer for harvester-machines or other wheeled vehicles, hereinafter to be more particularly described and claimed.

In the drawings, Figure 1 is a back view of the equalizer, showing the draft-pole in section, the section being taken on the line $x\,x$ of Fig. 2. Fig. 2 is a plan view of the draft-equalizer, with a portion of the harvester and draft-pole.

In the ordinary forms of draft-equalizers now in use in harvester-machines, in which two or three horses of the team are attached to the draft-pole on the right-hand side away from the standing grain, the equalizing mechanism is of such character that when the attempt is made to turn the machine to the left around the corner of the field of standing grain those horses removed from the draft-pole can be of little assistance in making such turn, the action of the equalizer being such that the pull of the team has no turning effect on the harvester, such effect being produced only by the animals next to the pole. It is also impossible with the present forms of draft-equalizers to provide against inequalities of draft occasioned by the difference in the resistance encountered when the harvester is operating its cutting mechanism in the field, or when it is being dragged along the roadway. In the first case the greatest resistance is to the left of the draft-pole, and if the said pole is so located as to avoid side draft, under this condition of affairs, the balance is destroyed when the cutting mechanism is not in operation, the machine being on the road, and there is then an appreciable side draft to the right. On the other hand, if the pole is so located as to avoid this side draft when the machine is upon the road, there is a corresponding side draft to the left when the cutting mechanism is in operation. To avoid these differences, and to obtain a practical and simple equalizing-gear, I have designed the construction illustrated and hereinafter described, in which—

A represents a portion of the harvester-frame.

B is the draft-pole rigidly attached thereto.

C is a long lever pivoted to the pole on the binder side of the harvester at P, and extending to the right.

D is a second lever pivoted to the first lever C at C′, as shown in Fig. 1.

E is a third lever or doubletree pivoted to one end of the lever D, to the other and the long end of which is pivoted the whiffletree W′ by means of the link L′. The whiffletrees W″ W‴ are attached to the doubletree E by means of the links L″ and L‴ in a similar manner. The whiffletree W for the single horse to the left of the draft-pole is pivoted to the lever F by means of the pin and link L, which said lever F is pivoted to the draft-pole at P′, as shown in Fig. 2.

In order to properly adjust the draft between the three horses on the one side and the one horse on the other side of the draft-pole, the levers F and C are connected by the rope or cable R, which passes around the adjustable pulley H. The ends of the rope R are attached to the lever by means of the pivoted bails R′ R″, or in any other equivalent convenient manner. The pulley H is mounted in the swinging frame K, which is pivoted to the draft-pole at K′, the other end of said frame in which the pulley is mounted being adjustable by means of the braces M and N. The ends of these braces have suitable perforations $o\,o'$ and $q\,q'$, &c., through which the bolts O and Q may be passed.

The guy G extends from the outer end of the lever D to the harvester-frame, and is normally slack, except when the horses attached to the whiffletrees W″ and W‴ are whipped up in turning a corner.

The operation and advantages of my invention are the following: By a suitable adjustment of the frame K toward and from the draft-pole by means of the braces M and N the lever-arms of the forces acting in the two portions of the rope R are varied, so that the draft-equalizer mechanism may be adjusted so as to adapt itself to the varying strain of the respective horses making up the different teams attached thereto. The advantages of the two braces M and N over one are twofold. In the first place, the two braces give a greater rigidity and nicety of adjustment than one brace, inasmuch as one may be put under the strain of compression while the other may be put under the strain of tension, so that all lost motion will be taken up. In the second place, the two braces will enable the strain, after maintaining the adjustable frame at the various positions of its adjustment, to be most advantageously disposed—that is, when the frame is adjusted at an acute angle with the draft-pole the tendency of the rope R will be to draw it toward said draft-pole, and this tendency can be most advantageously resisted by the direct thrust of the short brace N. When, on the other hand, the frame K is adjusted away from the draft-pole to form a more obtuse angle thereto, the tendency of the rope R is to draw it farther away, which tendency is most advantageously resisted by the brace M.

Another and important feature of my invention lies in the capability of the brace M of being attached directly to the harvester-frame by being turned into the position shown in dotted lines at M' and attached to the frame by the bolt T. This transmits a portion of the traction-strain upon the pulley H and frame K directly to the harvester-frame A, and consequently the resultant of the tractive forces passes through a point to the left of the draft-pole B, Fig. 2, said point coinciding nearly or exactly with the center of resistance at which the drag of the harvester proper and the drag of the cutting mechanism may be supposed to immediately combine in one resultant resisting force. When the harvester is upon the road and the cutting mechanism is out of gear, the brace M is returned to the position shown in full lines, and the tractive forces are all transmitted through the pole B again coinciding with the center of resistance, which has been shifted, by throwing the cutting mechanism out of gear, as above explained.

Another feature of my invention which adds to the adjustability of the equalizer is the adjustable connection attached to one end of the rope R—as, for instance, that terminating in the bail R'—to the lever F by means of the holes $x$ $x'$ $x''$, into any one of which the bolt Y, passing through the bail R', may be inserted. By this arrangement of the lever-arm the single horse attached to the whiffletree W exercises his force upon the equalizing mechanism, and it may be directly varied, and this, together with the adjustability of the arm K, renders the perfect adjustment of the equalizing mechanism possible and easily attained.

It is evident, of course, that my draft-equalizer could be applied to other uses than that of equalizing the draft on a harvesting-machine. It might, for instance, be used upon a plow, in which case the lever C and the lever F would be reversed in their positions in order to bring the main portion of the team upon the unplowed portion of the field. In that case the rope R would pass around a pulley mounted on the plow-frame. In the same way the apparatus might be attached to any vehicle or any apparatus where the traction of a large number of horses is necessary.

Having therefore described my invention, what I claim as new, and desire to protect by Letters Patent, is—

1. In a draft-equalizer, the combination of the harvester-frame, the draft-pole, the levers pivoted on opposite sides of the draft-pole, to which levers the whiffletrees are attached, the pulley mounted in a frame adjustable on the draft-pole, the rope passing over said pulley and connecting said levers, and the two adjustable braces by which the position of the pulley-supporting frame relative to the draft-pole is determined and the draft-strain transmitted, together with the guy independent of the draft-equalizing apparatus extending from one of the above-mentioned levers to the frame of the harvester, whereby the portion of the team on that side of the pole exercises a positive pull to haul the harvester around the corners of the field of standing grain, substantially as described.

2. In a draft-equalizer, the combination of the harvester-frame, the draft-pole, the levers pivoted on opposite sides of the draft-pole, to which levers the whiffletrees are attached, the pulley mounted in a frame adjustable on the draft-pole, the rope passing over said pulley and connecting said levers, and the two adjustable braces by which the position of the pulley-supporting frame relative to the draft-pole is determined and the draft-strain transmitted, substantially as described.

3. In a draft-equalizer, the combination of the harvester-frame, the draft-pole, the levers pivoted on opposite sides of the draft-pole, to which levers the whiffletrees are attached, the pulley mounted in a frame adjustable on the draft-pole, and the adjustable brace by the arrangement of which a part of the draft-strain borne by said pulley may be transmitted directly to the harvester-frame, or may be all transmitted to the draft-pole, substantially as described.

4. In a draft-equalizer, the combination of the harvester-frame, the draft-pole, the levers pivoted on opposite sides of the draft-pole, to which levers the whiffletrees are attached, the pulley mounted in a frame adjustable on the draft-pole, the rope passing over said pulley and connecting said levers, and the two adjustable braces by which the position of the pulley-supporting frame relative to the draft-pole is determined and the draft-strain transmitted, together with the adjustable attachment of said rope to one of said levers, substantially as described.

In testimony whereof I affix my signature in presence of two witnesses.

HUGH JOHN GUNN.

Witnesses:
ALEXANDER GUNN,
GEORGE JACKSON.